United States Patent [19]

Atwell, Jr. et al.

[11] Patent Number: 4,749,929
[45] Date of Patent: Jun. 7, 1988

[54] INTERLOCKED STATE MACHINES

[75] Inventors: William D. Atwell, Jr.; Michael L. Longwell, both of Austin, Tex.

[73] Assignee: Motorola, Inc., Schaumburg, Ill.

[21] Appl. No.: 945,276

[22] Filed: Dec. 22, 1986

[51] Int. Cl.⁴ ............................................. G05B 11/32
[52] U.S. Cl. ................................................. 318/625
[58] Field of Search ....................... 318/39, 41, 46, 47, 318/49, 50, 51, 85, 336, 337, 338, 404, 405, 406, 625

[56] References Cited

U.S. PATENT DOCUMENTS

| | | | |
|---|---|---|---|
| 4,084,118 | 4/1978 | Grancoin | 318/85 X |
| 4,126,819 | 11/1978 | Stobbe et al. | 318/810 X |
| 4,616,277 | 10/1986 | Berti | 318/625 X |
| 4,617,498 | 10/1986 | Ruppert | 318/41 X |

OTHER PUBLICATIONS

Hirschman et al; "Circuit for Synchronizing Two Rotating Devices", IBM Technical Disclosure Bulletin, vol. 16, No. 11, Apr., 1974.

*Primary Examiner*—Bentsu Ro
*Attorney, Agent, or Firm*—John A. Fisher; Jeffrey Van Myers

[57] ABSTRACT

Two state machines, each active during a respective one of two complementary non-overlapping clock phases, are interlocked so that the present state of one machine determines the next state of the other machine, and vice versa.

6 Claims, 3 Drawing Sheets

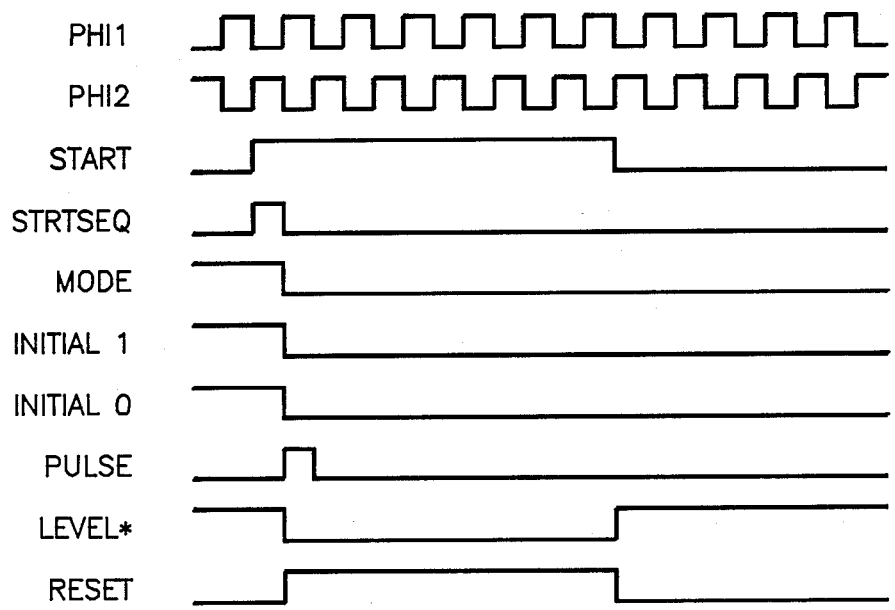
CASE I – FAST DECISION TIMING DIAGRAM
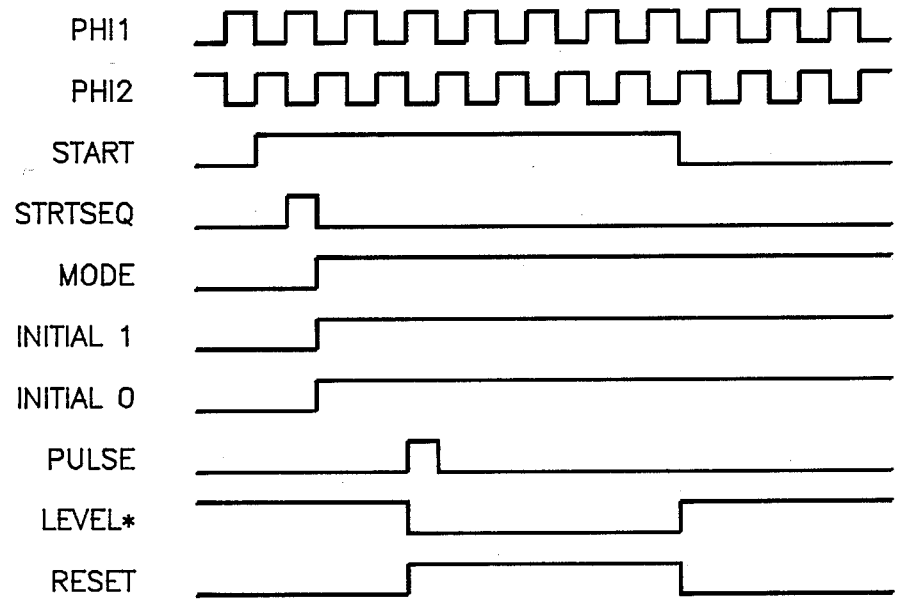
CASE II – SLOW DECISION TIMING DIAGRAM
FIG. 3

INTERLOCKED STATE MACHINES

FIELD OF THE INVENTION

The subject invention relates generally to state machines and, more particularly, to interlocked state machines.

BACKGROUND ART

In general, a state machine is comprised of a next state encoder, a set of present state latches, and a present state decoder. In a typical configuration, the inputs of the next state encoder include present state information from the outputs of the present state decoder and one or more other input signals indicative of current conditions in the surrounding system. During one phase of the machine's clock, the encoded outputs of the next state encoder are latched by the present state latches. During the next phase (or the same phase if the latches are sufficiently fast), the outputs of the latches are decoded by the present state decoder and used by the next state encoder, together with selected "current" signals, to encode the next state to be latched by the present state latches.

In conventional state machines, the set of conditions which must exist before the machine moves from one state to another state are defined in the construction of the next state encoder. In general, the "present" state, as reflected by the outputs of the present state decoder, is logically combined by the next state encoder with selected system signals to determine what the "next" state should be. For example, if the relevant system signals are not yet correct, the next state may simply be the same as the present state. Thus, in prior art state machines, a primary input into the next state encoder is the output(s) of the present state decoder.

In the past, when two (or more) state machines were required to cooperate in order to accomplish a given function, the state machines were "linked" by having one or more of the outputs of the present state decoder of one machine forming inputs into the next state encoder of the other state machine, and vice versa. However, in each machine, the primary input of the next state encoder was still the output of the present state decoder of the SAME machine. Thus, although one machine could participate in the determination of the next state of the other machine, the present state of each machine still contributed significantly in the determination of the next state of that machine.

SUMMARY OF THE INVENTION

Accordingly, it is an object of the present invention to provide a method for interlocking two or more state machines.

Another object of the present invention is to provide an arrangement of interlocked state machines.

These and other objects are achieved by interlocking two or more state machines so that the outputs of one are the inputs of the next, with the outputs of the last being the inputs of the first. Preferably, each state machine is responsive to a different clock phase, each non-overlapping with respect to the others. In general, each state machine comprises a next state encoder having a plurality of inputs and a set of outputs; a set of present state latches having a set of inputs, each coupled to a respective one of the set of outputs of the next state encoder, and a set of outputs; and a present state decoder having a set of inputs, each coupled to a respective one of the set of outputs of the present state latches, and a set of outputs. In accordance with the present invention, the set of outputs of the present state decoder of the first of the state machines are coupled to respective inputs of the next state encoder of the second state machine, the set of outputs of the present state decoder of the second state machine are coupled to respective inputs of the next state encoder of the third state machine, if any, and so on until the set of outputs of the present state decoder of the last state machine are coupled to respective inputs of the next state encoder of the first state machine.

BRIEF DESCRIPTION OF THE DRAWING

FIG. 3 is a timing diagram illustrating the operation of the interlocked state machines of FIG. 2.

DESCRIPTION OF THE INVENTION

Figure 1:
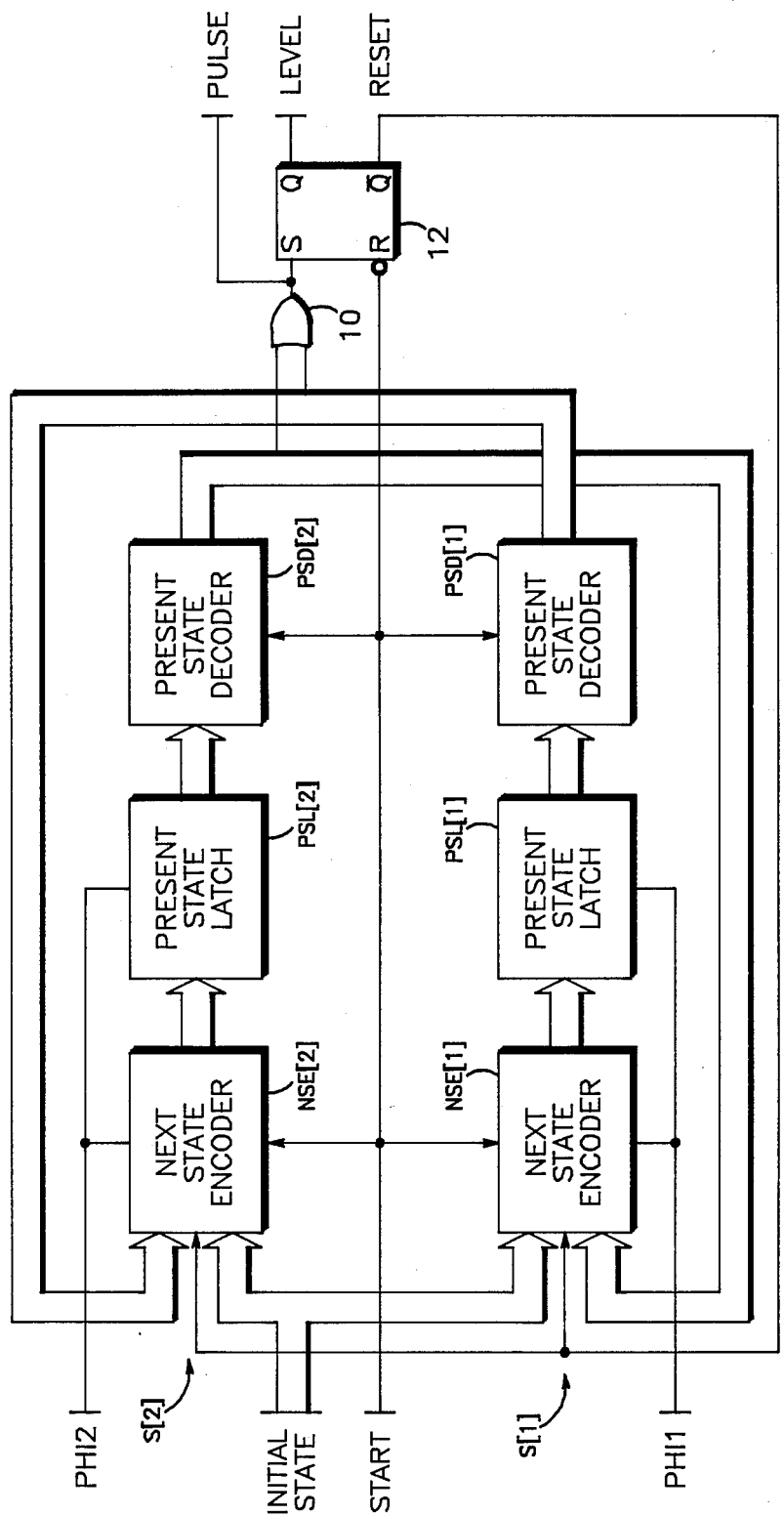
FIG. 1 illustrates in block diagram form, two state machines, S[1] and S[2], which are interlocked in accordance with the present invention.

Shown in FIG. 1 are interlocked state machines S[1] and S[2] which resolve on complementary, non-overlapping clock phases PHI1 and PHI2, respectively. As in conventional state machines, machine S[1] comprises a next state encoder NSE[1], a set of present state latches PSL[1], and a present state decoder PSD[1], all of conventional form. Similarly, machine S[2] comprises a next state encoder NSE[2], a set of present state latches PSL[2], and a present state decode PSD[2], all of conventional form. Unlike conventionally linked state machines, the output(s) of the present state decoder PSD[1] of machine S[1] comprises the primary input(s) to the next state encoder NSE[2] of machine S[2], while the output(s) of the present state decoder PSD[2] of machine S[2] comprises the primary input(s) to the next state encoder NSE[1] of machine S[1].

In response to the coincidence of a START signal and one of the clock phases, for example PHI1, the respective one of the machines, S[1] in this case, will assume an initial state. In the illustrated form, this initial state is defined by an externally-generated INITIAL STATE signal. On the following PHI2, the present state of machine S[1] determines the next state of machine S[2]. On the next PHI1, the present state of machine S[2] determines the next state of machine S[1], and so on, until one of the two machines, either S[1] or S[2], reaches a terminal state.

As in conventional machines, one or more of the outputs of the present state decoders, PSD[1] and PSD[2], may be used to generate useful signals. For example, the illustrated OR gate 10 detects a particular present state, regardless of which machine, S[1] or S[2], assumes that state. Since the progression of the interlocked machines S[1] and S[2] through any given state is generally transitory, the output of this OR gate 10 is effectively a PULSE signal. In contrast, latch 12 latches the output of the OR gate 10 to provide a longer term LEVEL signal. In some applications, the complementary output of the latch 12 may be used to RESET the machines and promptly terminate the PULSE signal. In response to the next START signal, latch 12 may be reset to terminate the LEVEL signal.

Figure 2:
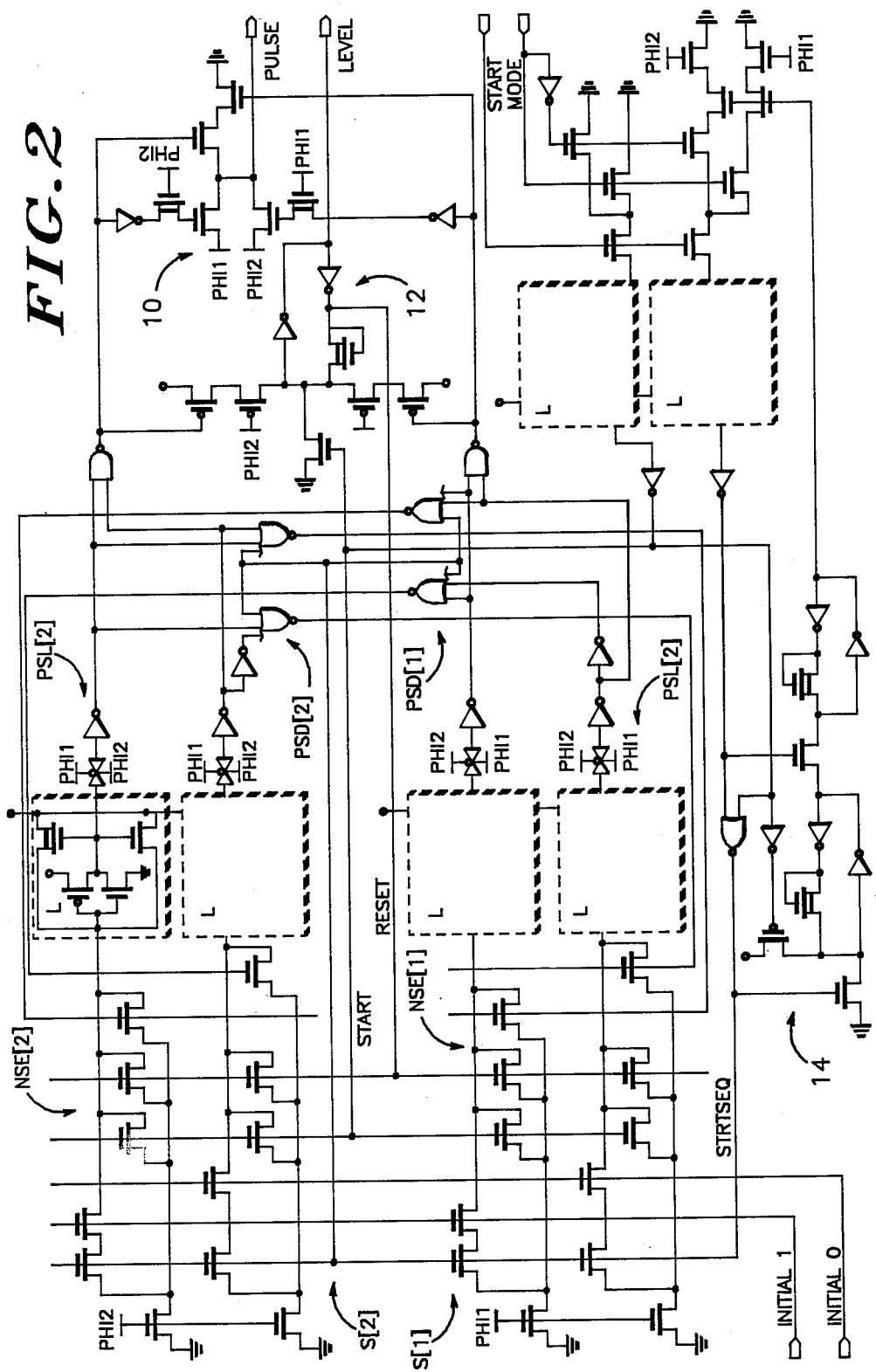
FIG. 2 illustrates a preferred embodiment of the interlock state machines of FIG. 1.

Shown in FIG. 2 is a preferred embodiment of a pair of state machines which are interlocked as in FIG. 1. In the illustrated form, the START signal may be selectively synchronized with either PHI1 or PHI2, depending upon the state of a MODE signal. This synchronized START signal in turn triggers a one-shot 14, with the resultant STRTSEQ pulse actually starting the machine which is active during the selected clock phase. In general, INITIAL0 and INITIAL1 select which of Four (4) different states that machine will initially assume. On succeeding clock phases, the two machines will progress through the remaining valid states, if any. Depending upon the selected initial state, the PULSE and LEVEL outputs will be asserted One (1), Two (2), Three (3) or Four (4) clock phases after STRTSEQ. In response to the machines being RESET, PULSE will be negated one clock phase later. LEVEL, on the other hand, will not be negated until START is negated. FIG. 3 illustrates the timing of the interlocked machines for two combinations of MODE and INITIALx. As can be seen, the interlocked state machines form a programmable half-cycle counter. Although the present invention has been described in the context of a preferred embodiment thereof, various changes may be made to the arrangement or operation of the several elements to improve performance or enhance functionality in particular applications. For example, the latch 12 may be reset using a wholly independent signal. Similarly, different INITIAL STATEs may be input into each machine. There is also no reason why the next state encode NSE[x] and present state decode PSD[x] of each machine cannot be different. Of course, more than two machines may be similarly interlocked, and any number of desired PULSE and/or LEVEL signals may be generated from the outputs of the available present state decoders PSD[x]. These and other changes and modifications may be made without departing from the spirit and scope of the invention.

What is claimed is:

1. The combination of
    a first state machine, responsive to a first one of two complementary non-overlapping clock phases, comprising:
    a next state encoder having a plurality of inputs and a set of outputs;
    a set of present state latches having a set of inputs, each coupled to a respective one of the set of outputs of the next state encoder of said first state machine, and a set of outputs; and
    a present state decoder having a set of inputs, each coupled to a respective one of the set of outputs of the present state latches of said first state machine, and a set of outputs; and
    a second state machine, responsive to a second one of said two complementary non-overlapping clock phases, comprising:
    a next state encoder having a plurality of inputs and a set of outputs;
    a set of present state latches having a set of inputs, each coupled to a respective one of the set of outputs of the next state encoder of said second state machine, and a set of outputs; and
    a present state decoder having a set of inputs, each coupled to a respective one of the set of outputs of the present state latches of said second state machine, and a set of outputs;
    characterized in that the set of outputs of the present state decoder of the first state machine are coupled to respective inputs of the next state encoder of the second state machine, and that the set of outputs of the present state decoder of the second state machine are coupled to respective inputs of the next state encoder of the first state machine.

2. The combination of claim 1 wherein a set of initial state inputs are selectively coupled to respective inputs of the next state encoder of one of the state machines.

3. The combination of claim 1 wherein the next state encoder of one of the state machines includes an input coupled to a signal other than an output of the present state decoder of the other state machine.

4. A method for interlocking
    a first state machine, responsive to a first one of two complementary non-overlapping clock phases, comprising:
    a next state encoder having a plurality of inputs and a set of outputs;
    a set of present state latches having a set of inputs, each coupled to a respective one of the set of outputs of the next state encoder of said first state machine, and a set of outputs; and
    a present state decoder having a set of inputs, each coupled to a respective one of the set of outputs of the present state latches of said first state machine, and a set of outputs; and
    a second state machine, responsive to a second one of said two complementary non-overlapping clock phases, comprising:
    a next state encoder having a plurality of inputs and a set of outputs;
    a set of present state latches having a set of inputs, each coupled to a respective one of the set of outputs of the next state encoder of said second state machine, and a set of outputs; and
    a present state decoder having a set of inputs, each coupled to a respective one of the set of outputs of the present state latches of said second state machine, and a set of outputs;
    the method comprising the steps of:
    coupling the set of outputs of the present state decoder of the first state machine to respective inputs of the next state encoder of the second state machine; and
    coupling the set of outputs of the present state decoder of the second state machine to respective inputs of the next state encoder of the first state machine.

5. The method of claim 4 further including the step of selectively coupling a set of initial state inputs to respective inputs of the next state encoder of one of the state machines.

6. The method of claim 4 further including the step of coupling a signal other than an output of the present state decoder of one of the state machines to an input of the next state encoder of the other state machine.

* * * * *